(12) United States Patent
Kosheleff

(10) Patent No.: US 9,022,312 B2
(45) Date of Patent: May 5, 2015

(54) FLY-IN LANDING PAD FOR LIFT-FAN AIRCRAFT

(71) Applicant: Patrick A. Kosheleff, Yankee Hill, CA (US)

(72) Inventor: Patrick A. Kosheleff, Yankee Hill, CA (US)

( * ) Notice: Subject to any disclaimer, the term of this patent is extended or adjusted under 35 U.S.C. 154(b) by 396 days.

(21) Appl. No.: 13/694,434

(22) Filed: Dec. 3, 2012

(65) Prior Publication Data

US 2014/0151502 A1    Jun. 5, 2014

(51) Int. Cl.
*B64F 1/00* (2006.01)
*B64F 1/26* (2006.01)

(52) U.S. Cl.
CPC . *B64F 1/007* (2013.01); *B64F 1/00* (2013.01); *B64F 1/26* (2013.01)

(58) Field of Classification Search
CPC .............. B64F 1/007; B64F 1/00; B64F 1/26; B64C 29/0075; E01C 9/083
USPC ..... 244/110 E, 116, 114 B, 114 R, 115, 12.1, 244/12.3, 137.4
See application file for complete search history.

(56) References Cited

U.S. PATENT DOCUMENTS

| | | | | |
|---|---|---|---|---|
| 1,363,539 A * | 12/1920 | Steinmetz | ........................ | 404/36 |
| 2,358,426 A * | 9/1944 | Tompson | .................... | 244/114 R |
| 2,360,674 A * | 10/1944 | Harter | ............................ | 404/36 |
| 2,361,163 A * | 10/1944 | Arthur | ............................ | 404/36 |
| 2,369,733 A * | 2/1945 | Greulich | ........................ | 404/35 |
| 2,371,017 A * | 3/1945 | Arthur | ............................ | 404/36 |
| 2,405,556 A * | 8/1946 | Bogle | ............................. | 404/36 |
| 2,719,452 A * | 10/1955 | Jones | ............................ | 411/456 |
| 2,814,453 A * | 11/1957 | Trimble, Jr. et al. | ............. | 244/63 |
| 2,851,232 A * | 9/1958 | Allen | ........................ | 244/114 R |
| 2,978,020 A * | 4/1961 | Paulsrude | ..................... | 160/183 |
| 3,028,130 A * | 4/1962 | Burton | ....................... | 244/137.1 |
| 3,280,560 A * | 10/1966 | Marchant et al. | ............ | 60/226.1 |
| 3,448,945 A * | 6/1969 | Ascani, Jr. | .................... | 244/12.3 |
| 3,456,909 A * | 7/1969 | Wainwright | .............. | 244/114 R |
| 3,616,111 A * | 10/1971 | Raech, Jr. | ........................ | 428/52 |
| 3,649,724 A * | 3/1972 | Rembert et al. | ............. | 264/459 |
| 3,797,787 A * | 3/1974 | Watanabe | ................. | 244/114 B |
| 4,116,408 A * | 9/1978 | Soloy | ........................ | 244/114 R |
| 5,275,356 A * | 1/1994 | Bollinger et al. | ............ | 244/12.3 |
| 5,429,324 A * | 7/1995 | Lynn | ......................... | 244/114 B |
| 5,681,010 A * | 10/1997 | Jensen | ........................... | 244/49 |
| 5,842,667 A * | 12/1998 | Jones | ......................... | 244/114 R |
| 6,554,227 B2 * | 4/2003 | Wolter | ......................... | 244/140 |
| 6,561,456 B1 * | 5/2003 | Devine | ........................ | 244/12.1 |
| 6,892,980 B2 * | 5/2005 | Kawai | .......................... | 244/12.4 |
| 7,163,351 B1 * | 1/2007 | Shaver | ............................ | 404/15 |
| 7,887,011 B1 * | 2/2011 | Baldwin | .................... | 244/137.4 |
| 2006/0198722 A1 * | 9/2006 | Coblentz | ...................... | 414/406 |

(Continued)

*Primary Examiner* — Tien Dinh
*Assistant Examiner* — Alexander V Giczy

(57) ABSTRACT

A lift-fan airplane lands vertically on dirt, kicking up debris but bringing a landing pad for use by others. The landing pad comprises many long slats hinged to each other at the sides. The slats are of generally increasing widths for rolling up into a tight spiral. This compact state allows low-drag air transport. After landing, the spiral is unrolled. A central slat has two stub axles sticking out the ends. Two men place a large wheel onto each stub axle, then push on the wheels to unroll the landing pad on the ground. An upturned wall at the end of the pad deflects upward the downwash from landing lift-fan VTOL airplanes, creating a shadow zone free of flying debris. This creates safe parking for massed operations. Inflated balloons, wedge-shaped to streamline necessary protuberances, detach and fill any large potholes under the landing pad.

2 Claims, 11 Drawing Sheets

(56) References Cited

U.S. PATENT DOCUMENTS

| | | | |
|---|---|---|---|
| 2008/0169375 A1* | 7/2008 | Ishikawa | 244/12.1 |
| 2009/0057486 A1* | 3/2009 | Becht et al. | 244/114 R |
| 2009/0071082 A1* | 3/2009 | Van Der Kort et al. | 52/202 |
| 2010/0308180 A1* | 12/2010 | Helou, Jr. | 244/35 R |
| 2011/0168834 A1* | 7/2011 | Yoeli | 244/12.3 |

\* cited by examiner

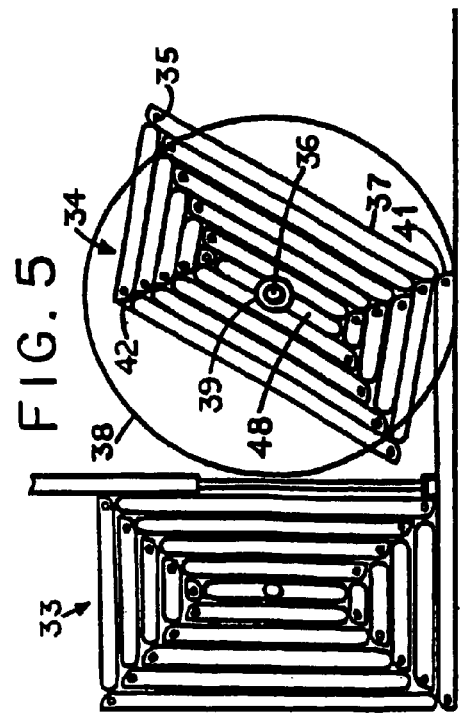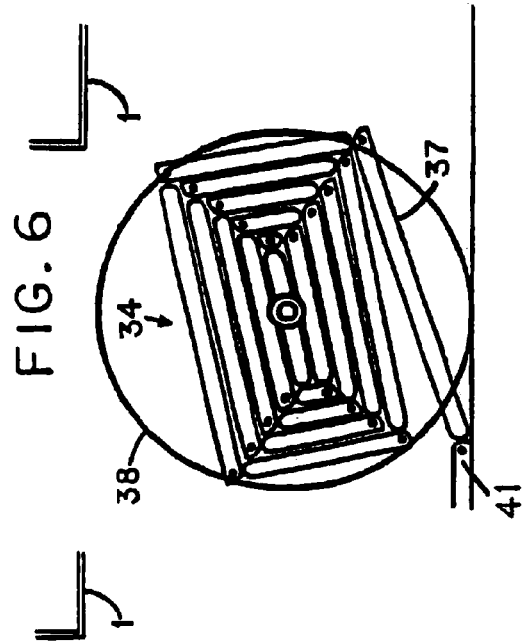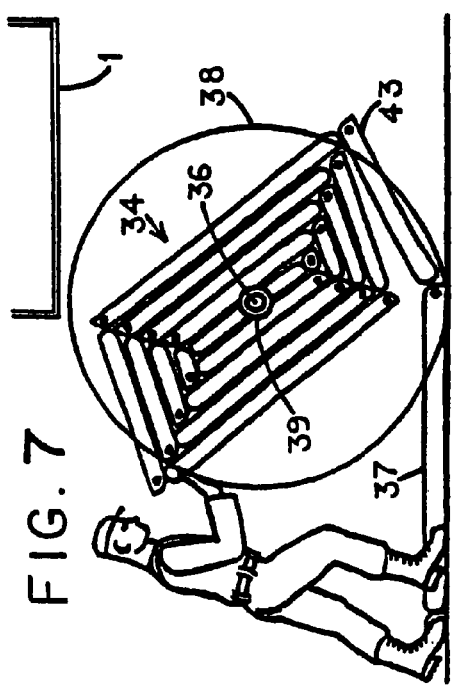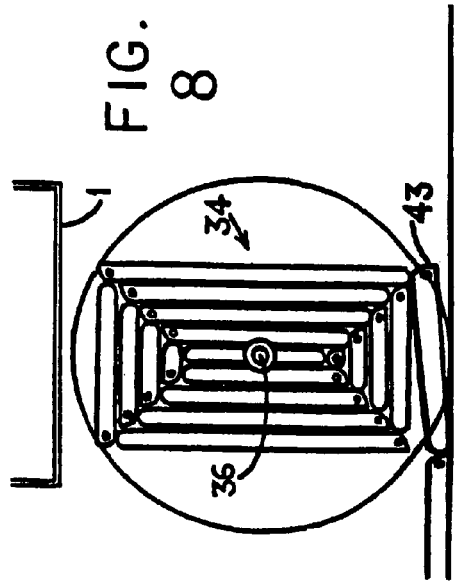

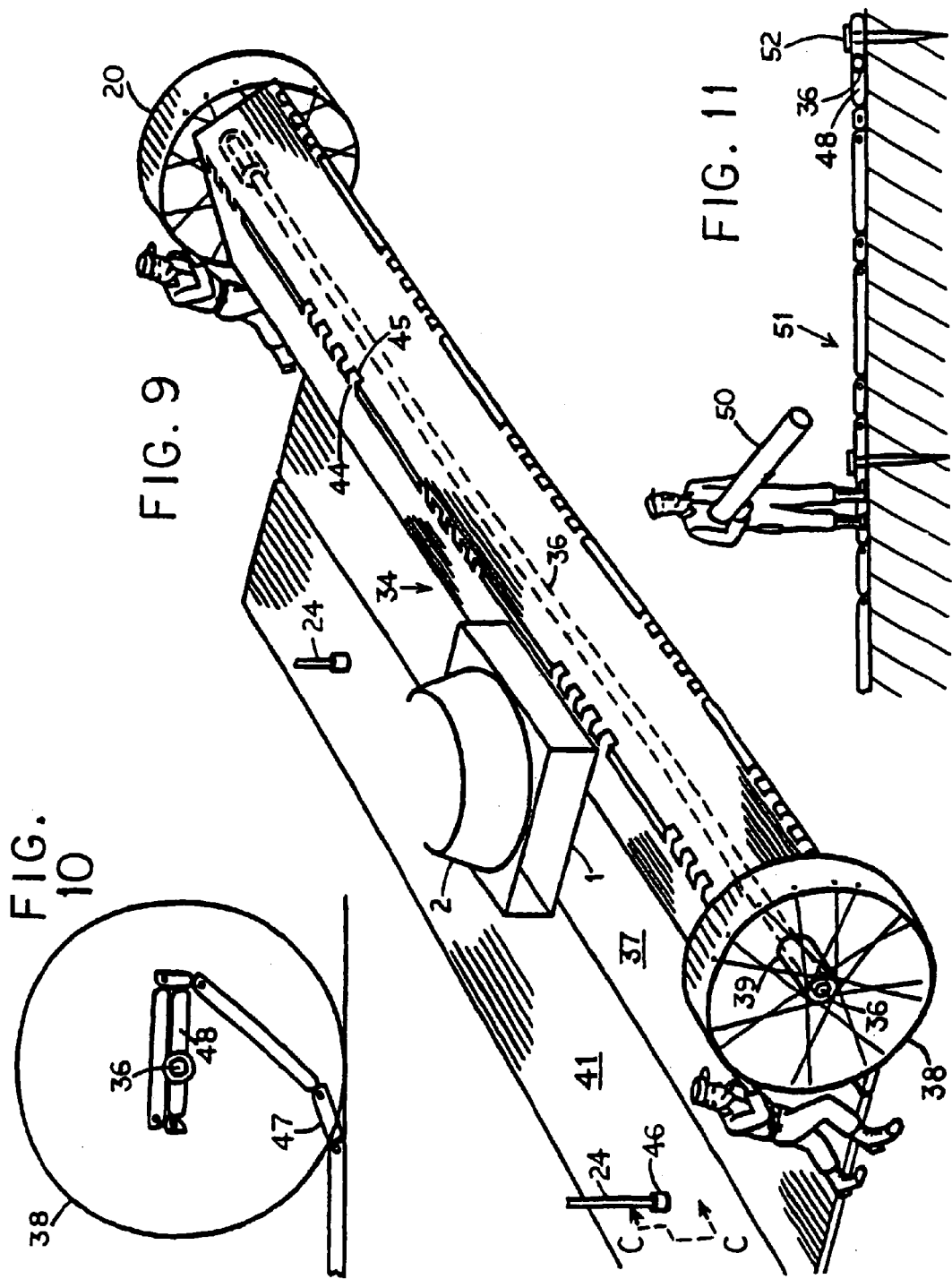

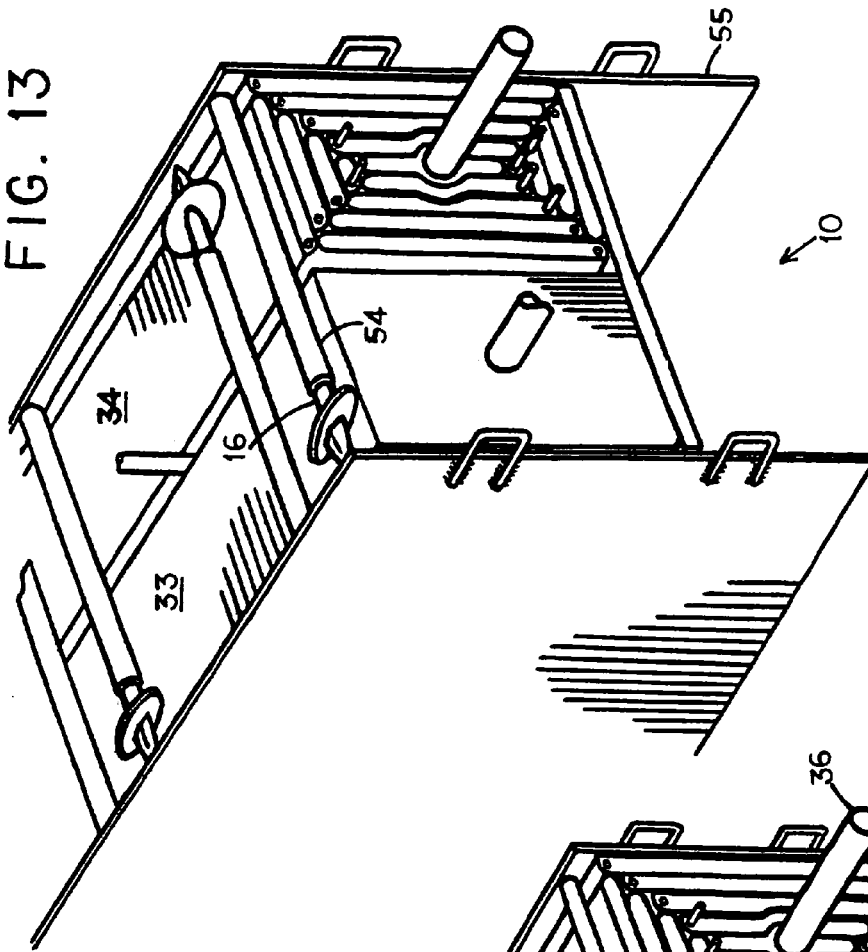
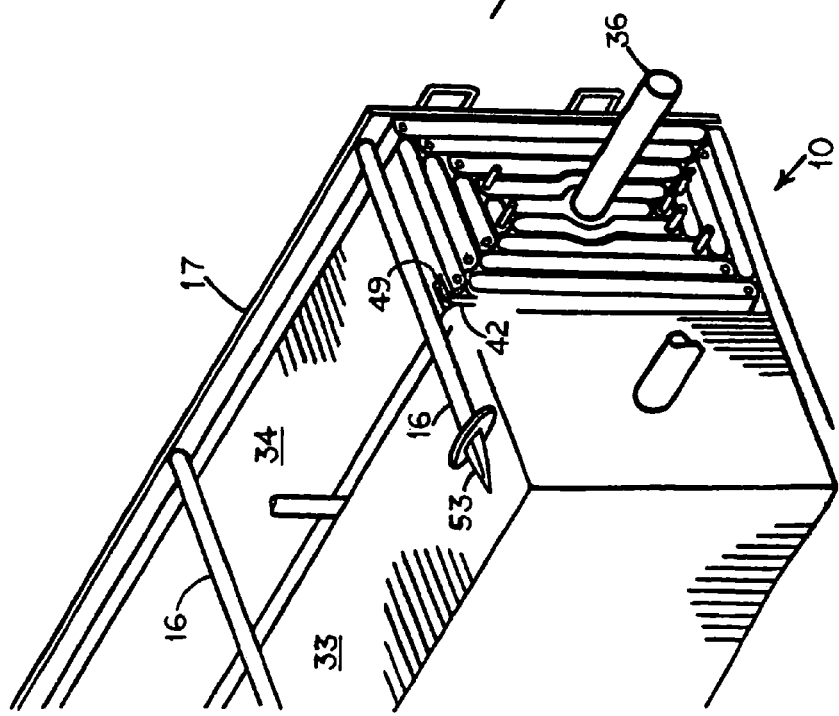

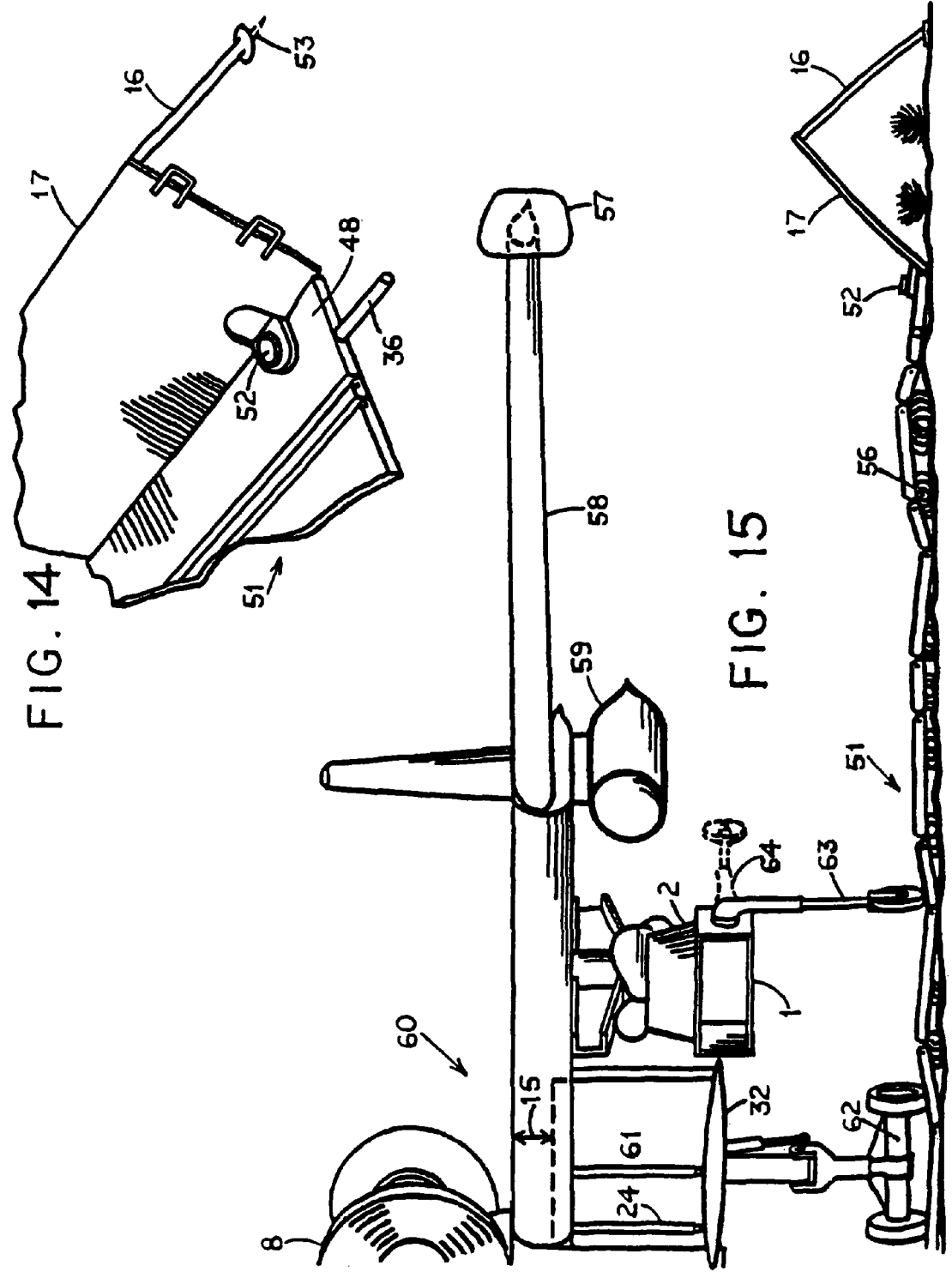

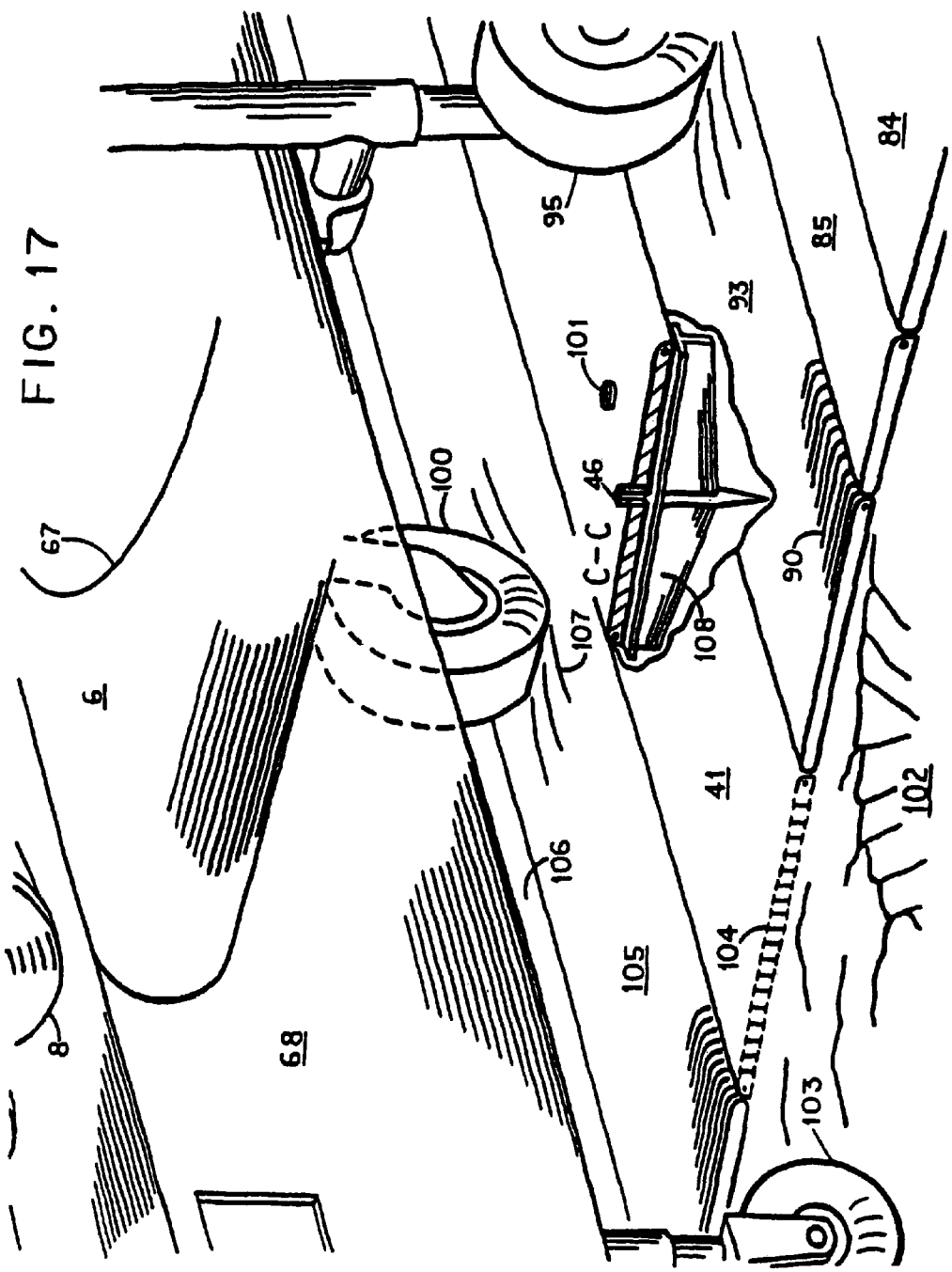

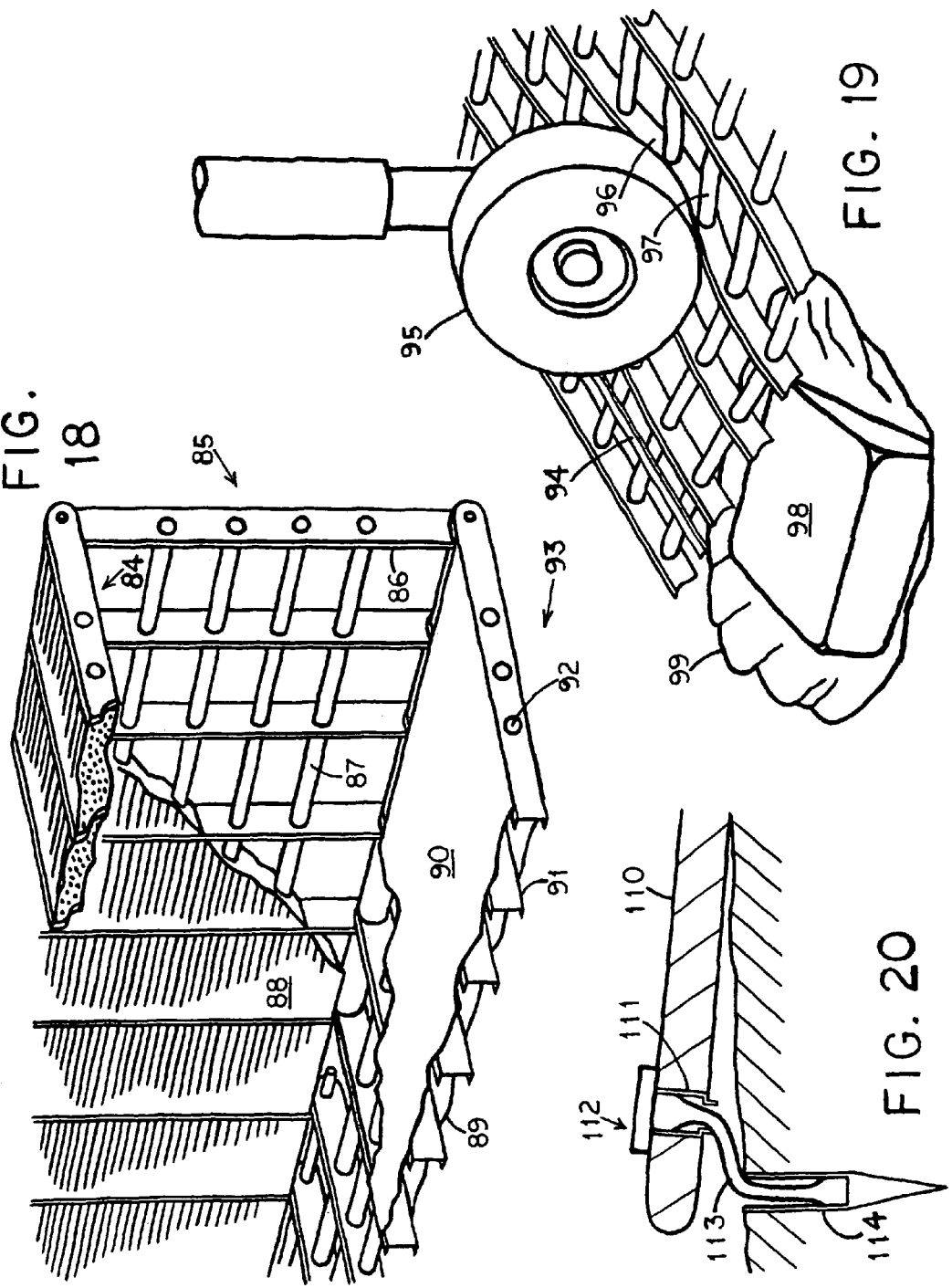

FLY-IN LANDING PAD FOR LIFT-FAN AIRCRAFT

BACKGROUND OF THE INVENTION

A VTOL airplane brings a landing pad in the compact state. The landing pad was rolled up for flight, but after landing it unrolls on the ground, to support the landing of subsequent lift-fan airplanes.

U.S. Pat. No. 3,456,909 brings a rolled-up carpet hanging under a helicopter. Unrolling at the desired landing site creates the landing pad for subsequent helicopters. Our rolling configuration is different.

U.S. Pat. No. 3,649,724 in its preliminary discussion cites prior art wherein a mat is rolled or otherwise compacted to a readily transportable state, then transported and dropped on the ground. Personnel on the ground may complete the deployment. We duplicate all these actions, but our compact state is more specific.

U.S. Pat. No. 2,371,017 shows a transportable mat which includes transverse bands 13 (which are) "in effect a relatively stiff panel." This resembles our landing pad made up of individual slats. The resemblance is carried further by his longitudinal flexibility which allows rolling up the mat (his FIG. 11.) In addition, placing two wheels on opposite ends of a central shaft lets his rolled-up mat be wheeled around easily. We also use two wheels at the ends of our rolled-up landing pad to unroll it. However, his rolled-up state doesn't pack the bands tightly. The right end of his FIG. 11 shows there is as much unused space as there is mat. The slats in our compact state are dimensioned to roll up tight.

At the end of our landing pad is an upturned wall that deflects upward the high-speed windblast from landing lift-fan airplanes. U.S. Pat. No. 5,429,324 is an example of an upward deflector wall; as are many others in subclass 244/114B. Our upturned wall plus support legs is built as a right angle, so it can be stored for air transport draped closely over the compact state.

Our airplane has a large downward excavation in the middle of the fuselage which contains the cargo represented by the compact state. The large excavation leaves only a narrow spine up high as the load-carrying structure. U.S. Pat. No. 6,554,227's aircraft is similar. Flexing of our narrow spine is a possibility. A long, outside brace is added down low on the fuselage to stiffen it. No prior example was found.

SUMMARY OF THE INVENTION

An airplane capable of a vertical landing brings a portable landing pad in a compact state. The landing pad has a deformable flat surface which will be deployed along the ground for use by subsequent lift-fan VTOL airplanes. The compact state makes the landing pad air-transportable. Compact state is attained before flight by rolling up the deformable surface.

The preferred embodiment of the deformable surface is many long slats each flexibly joined to two adjacent slats at the long edges. This is excepting the two end slats, which connect only once. One end slat is hinged to a base plate which supports the weight of the rolled-up pad. The other end slat will be the center slat. It has stub shafts sticking out its lengthwise ends to facilitate the rolling and unrolling. Rolling up the slats before takeoff achieves the compact state. The slats are fabricated with steadily increasing widths. Then the slats can wind up to make a tight spiral roll. Unrolling after landing is the reverse operation. Unrolling can be done by two husky men pushing on six-foot wheels, each one slipped over one end of the stub shafts first.

An upturned wall at the end of the deployed landing pad deflects upward the blast of air from landing VTOL airplanes. These create a downdraft air velocity much greater than with helicopters. Small debris on the ground are picked up and hurled outward, possibly causing damage or injury. The upturned wall creates a "shadow zone" free from the windblast. The landing pad itself keeps the debris on the ground. Thus, massed operations using many lift-fan VTOL airplanes can be conducted safely.

Landing pad weight is a concern because it is desired to air-transport it by a medium-sized aircraft with a wingspan less than, say, 100 feet. Most slats can be made of lightweight plastic, for instance ABS. At least two slats have to be much stronger, to bear the load on the VTOL aircraft's landing gear wheels. Strong slat construction can be steel skin and stamped steel ribs.

Potholes under the deployed landing pad can be filled by inflated small balloons, wedge-shaped and initially used to streamline drag-causing but necessary protuberances in flight.

BRIEF DESCRIPTION OF THE VIEWS

FIG. 5 is an elevation of the roll-packs, one starting to unroll.

FIGS. 6-8 are an elevation of the roll-pack unrolling.

FIG. 9 is an oblique view of the roll-pack and the manhandlers.

FIG. 10 is an elevation of the last stages of unrolling.

FIG. 11 is an elevation of securing the deployed landing pad.

FIG. 12 is an oblique view of a first upturned wall stored.

FIG. 13 is an oblique view of a second upturned wall stored.

FIG. 14 is an oblique view of installing the upturned wall.

FIG. 15 is an elevation of the cargo airplane leaving the pad.

FIG. 17 is an angled elevation of subsequent airplane on the pad.

FIG. 18 is an oblique view of slat construction methods.

FIG. 19 is an oblique view of landing pad versus pothole protocol.

FIG. 20 is a sectional view of an elastic hold-down nail.

DETAILED DESCRIPTION

Vertical Take-Off and Landing ("VTOL") airplanes are known. The V-22 "Osprey" tilt-rotor airplane is the latest example. The present invention concerns VTOL airplanes bf the lift-fan type. These have smaller rotors which turn quite fast. The air downflow 13 in FIG. 1 which creates lift is faster too. When lift-fan airplanes land on ordinary ground, they kick up dirt or pebbles 12 which can attain high speeds. Damage to property or injury to people can result. The invention aims to reduce that hazard.

Figure 1:
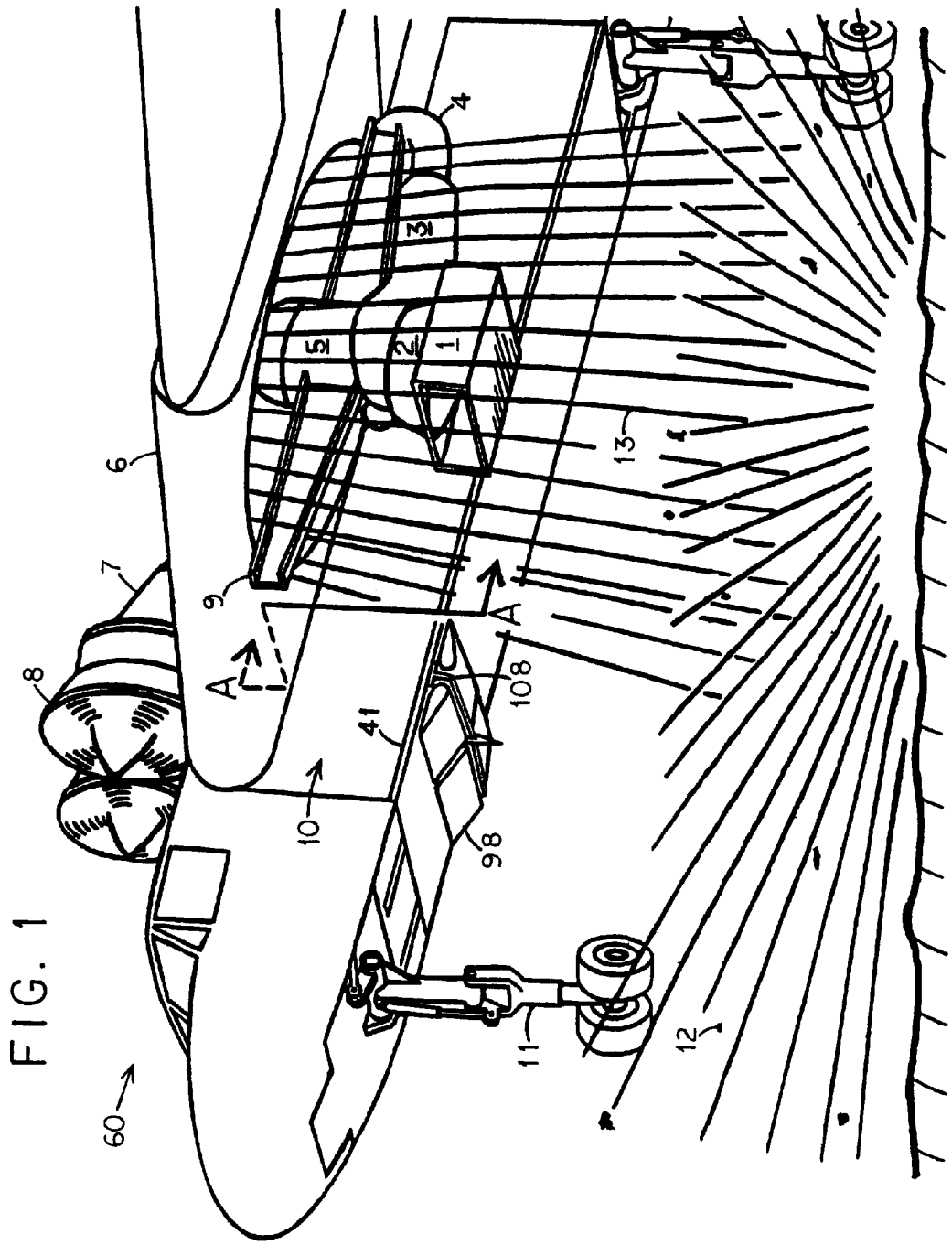
FIG. 1 is a side elevation of a lift-fan airplane landing on dirt.

In FIG. 1, lift-fan airplane 60 is medium-sized, with a wingspan of 90 feet and able to carry a payload of 10,000 lbs. Airplane 60 is a cargo plane. Its cargo load 10 is a rolled-up landing pad for subsequent lift-fan airplanes to land on.

The best-known VTOL aircraft are helicopters, which have large rotors. The UH-60A "Blackhawk" can carry 16 people and its rotor diameter is 53½ feet. Large, slow-turning rotors are most efficient to create vertical lift. A desire to achieve a faster cruise when not in VTOL mode caused the development of the V-22 "Osprey". Its 38-foot rotors tilt forward for cruise flight which is almost twice as fast as in helicopters. Continuing the downward trend in rotor size leads to airplane designs with lift fans like the ones in U.S. Pat. No. 6,561,456.

In our airplane 60 of FIG. 1, bulky pylon 6 contains a 16-foot lift fan, shown later. A combustion chamber 3 and turbine 2 power the lift fan above gear housing 5. The lift fan (such as 28 in FIG. 4) creates FIG. 1's downward rush of air 13. Although not seen until FIG. 2, there are a second pylon and lift fan on the far side of aircraft 60. In other words, a layout similar to U.S. Pat. No. 6,561,456.

The advantage of a lift-fan airplane is that it has a fast cruise, using turbofans with front fan 8 like a conventional airplane. The disadvantage, and it is major, is the hurricane-like blast of air 13 which is needed for sustentation in vertical flight. The logic of the situation is straightforward. If the rotor is small, it must move the limited amount of air very fast to generate enough lift. The probable consequence of flying debris damage follows.

The magnitude of the problem is indicated by a calculation. The standard formula for the lift generated by air thrown downward at a certain velocity is used: Equation 12 in Paper 660576, Society of Automotive Engineers ("SAE"), also in bound SAE Transactions, 75:122 (1976), page 125. The calculation is in our Appendix A. The result is given here. At a takeoff gross weight of 47,500 lbs, the Osprey with its 38-foot rotors must create a downward airflow of 94 feet per second. At the same gross weight, our aircraft with 16-foot rotors must create a downward airflow at 224 ft/sec. The goal of the invention is to neutralize its risk.

The Initial Landing

In FIG. 1, the schedule for airplane 60 is that it will be the first one to land vertically out of a group, the rest of which will carry people. Before the others land, airplane 60 brings a landing pad 10, now rolled up and resting against a base plate 41. Landing pad 10 will be deployed for use by the rest of the lift-fan airplanes. In other words, the airplane of FIG. 1 will land as shown, kicking up a storm of flying small debris in all directions, but it will be the only one to do so.

After the Landing

Figure 2:
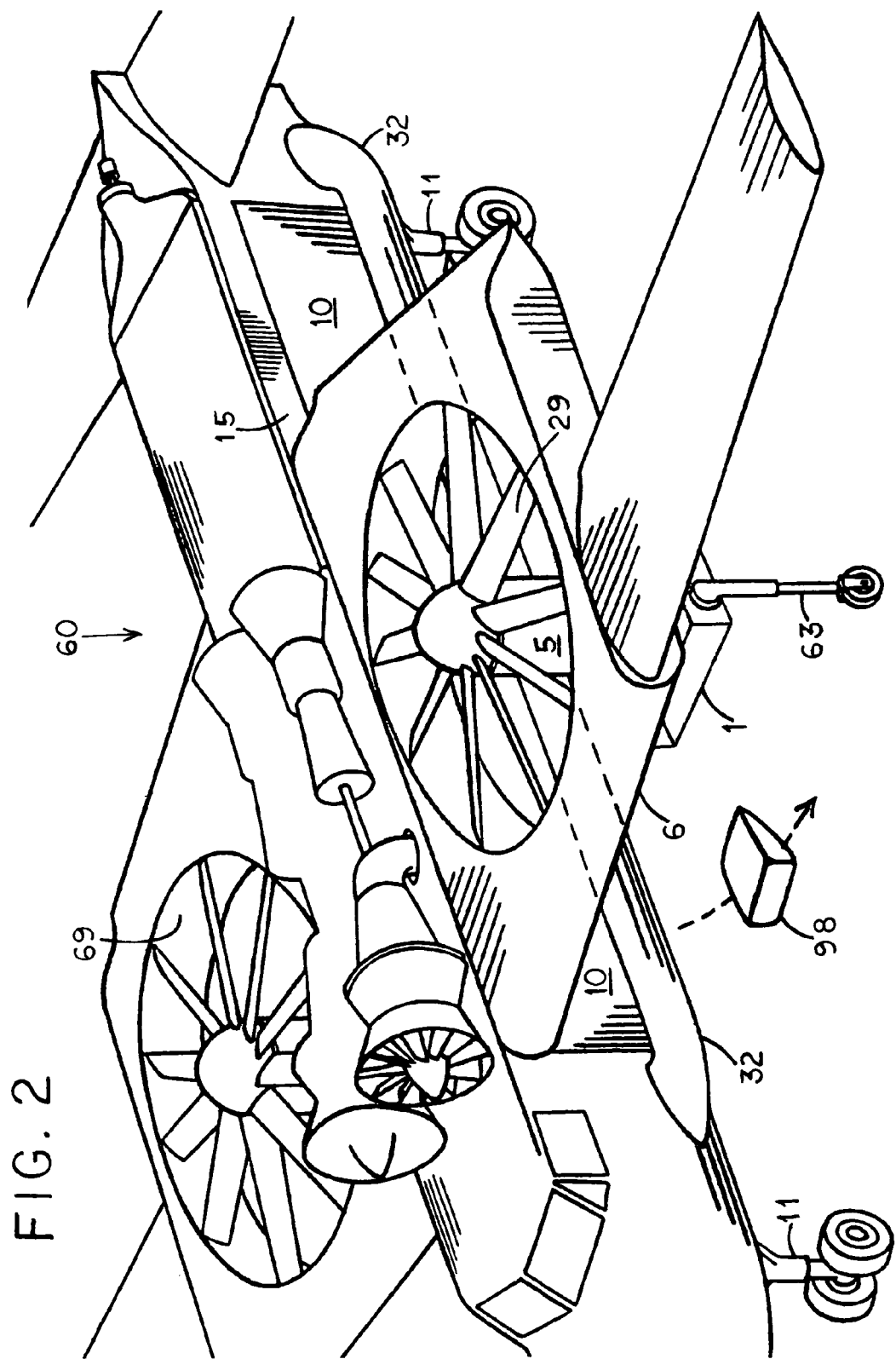
FIG. 2 is an oblique view of the landed airplane.

FIG. 2 shows airplane 60 standing on the ground. Lift fan 29 has stopped, as has the second lift fan in lift-fan bore 69. The weight of airplane 60 is resting on the two main landing gears 11 of similar or identical construction. The placement of landing gears 11 is dictated by long cargo load 10. This load will be lowered to the ground. Landing gears 11 are out of the way. The narrow track of the wheels is compensated by outrigger wheel 63 attached to turbine protector 1. Wheel 63 keeps airplane 60 from tipping over. Another wheel (not shown) would be on the other side.

Long and bulky cargo 10 leaves very little of the fuselage except for a shallow structural spine 15 at the top. Although similar to U.S. Pat. No. 6,554,227, there is the possibility of excessive flexing of spine 15. Long brace 32 attaches down low to the fuselage extremities and restores the rigidity of a full-depth fuselage. A second brace (not shown) would be on the other side. Brace 32 is just a long hollow tube, with enough strength to resist buckling by the compressive load during flight. Hollow brace 32 could be a fuel tank for long-range missions.

FIG. 2 is when the inflated wedge balloons 98 of FIG. 1 would be removed. Their use will be seen much later in connection with FIG. 19. (That would be filling potholes under the landing pad.)

Figure 3:
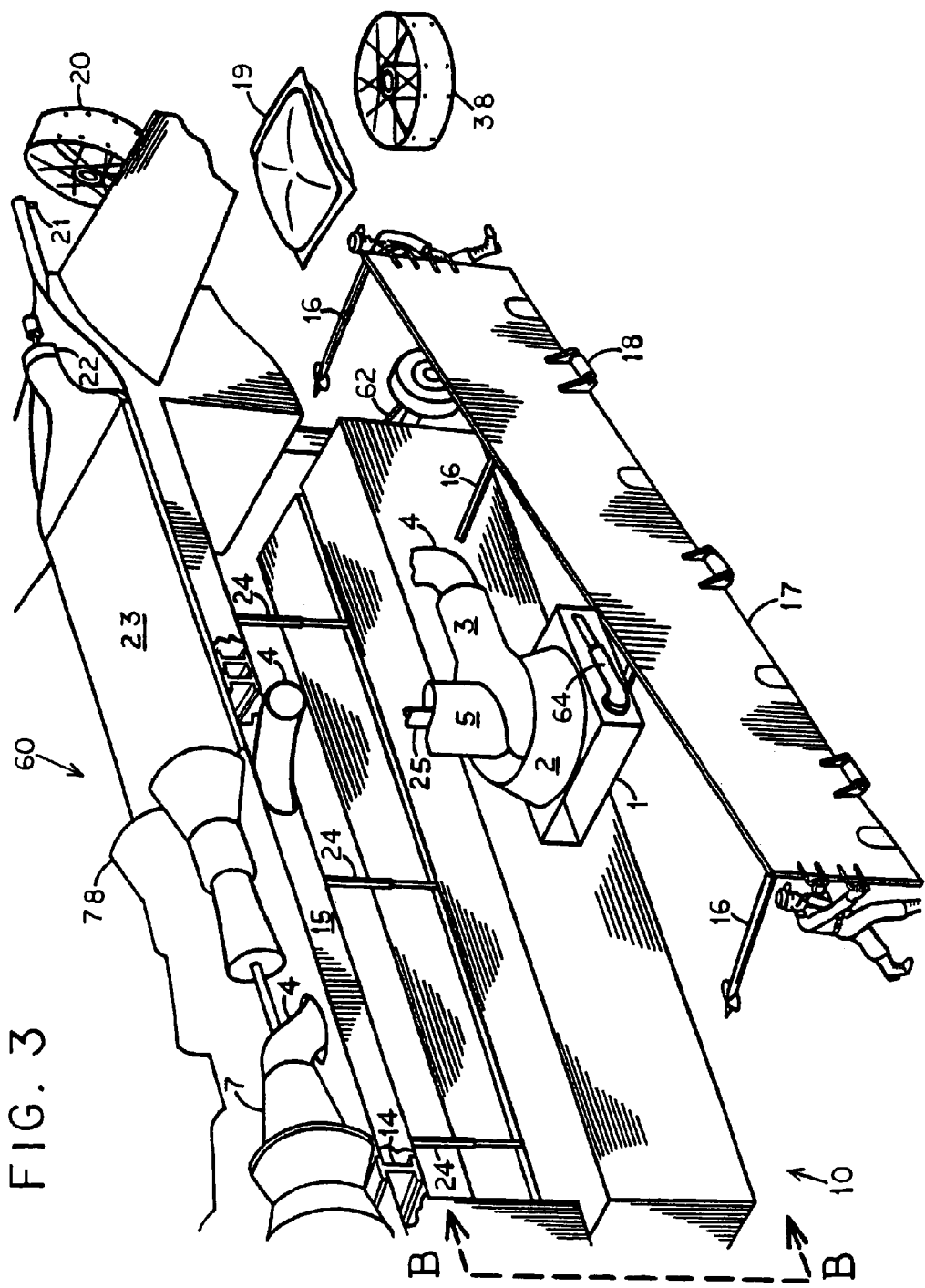
FIG. 3 is an oblique view of the unloaded airplane.

In FIG. 3, large pylon 6 and lift fan 29 from FIG. 2 are omitted. Spar segments like 14 are visible, also pieces of compressed air duct 4 which will convey the output of boost compressor 7 to combustion chamber 3. Absence of pylon 6, lift fan 29 and brace 32 reveals the main item, cargo pack 10. It was lowered to the ground by the motor-driven untwisting of nested screw jacks 24.

Portable wall 17 and braces 16 had been-stored on cargo pack 10 as will be seen in FIG. 12. In FIG. 3, after cargo pack 10 has been lowered to the ground, two husky guys pulled wall 17 off cargo pack 10 and are manhandling it out of the way. Rollers 18 may keep wall 17 from dragging in the dirt. Wall 17 and its four braces 16 will eventually be set down as a hump on the ground at the end of the landing pad. Then wall 17 will be an inclined wall able to deflect upward part of the windblast from landing lift-fan airplanes. This is one part of neutralizing the threat of flying debris.

The other part will be described in Figures after FIG. 3 and is simply the unfurling of the landing pad now contained in its compact state in cargo pack 10. Once unrolled, the landing pad will cover the dirt and contain its sticks and pebbles.

In FIG. 3, the second action is that wheels 38 and 20 are pushed off the tail shaft by ram stud 21. Wheels 38 and 20 were carried on the tail shaft during cruise flight. In that position, the wheels with bicycle spokes are mostly empty space and create little drag. But now they're needed for FIGS. 4-10. Cushion 19 will soften wheel 20's impact with the ground. Wheel 38 previously bounced off cushion 19 and is already on the ground.

Although large pylon 6 was omitted from FIG. 3, the power pack 2-5 for the lift fan was left in place. To be covered in detail later with FIG. 16. But for now, turbine protector 1 was there to block small-arms fire from below during a military landing, while allowing turbine 2's exhaust gas to exit through the opening at numeral 1 and a similar opening at the rear. Strut 64 for the outrigger wheel of FIG. 2 is up and out of the way of portable wall 17. Counteracting the loss of stability, wider landing gear 62 (seen in more detail in FIG. 15) keeps airplane 60 from tipping over.

Portable wall 17 and braces 16 can just pass under turbine protector 1 without any contortion by the two soldiers. The unfurling of cargo pack 10's contents will also have to clear, as seen in the following Figures. But first, the lift fan which is the reason for the landing pad is presented in FIG. 4.

The Lift Fan

Figure 4:
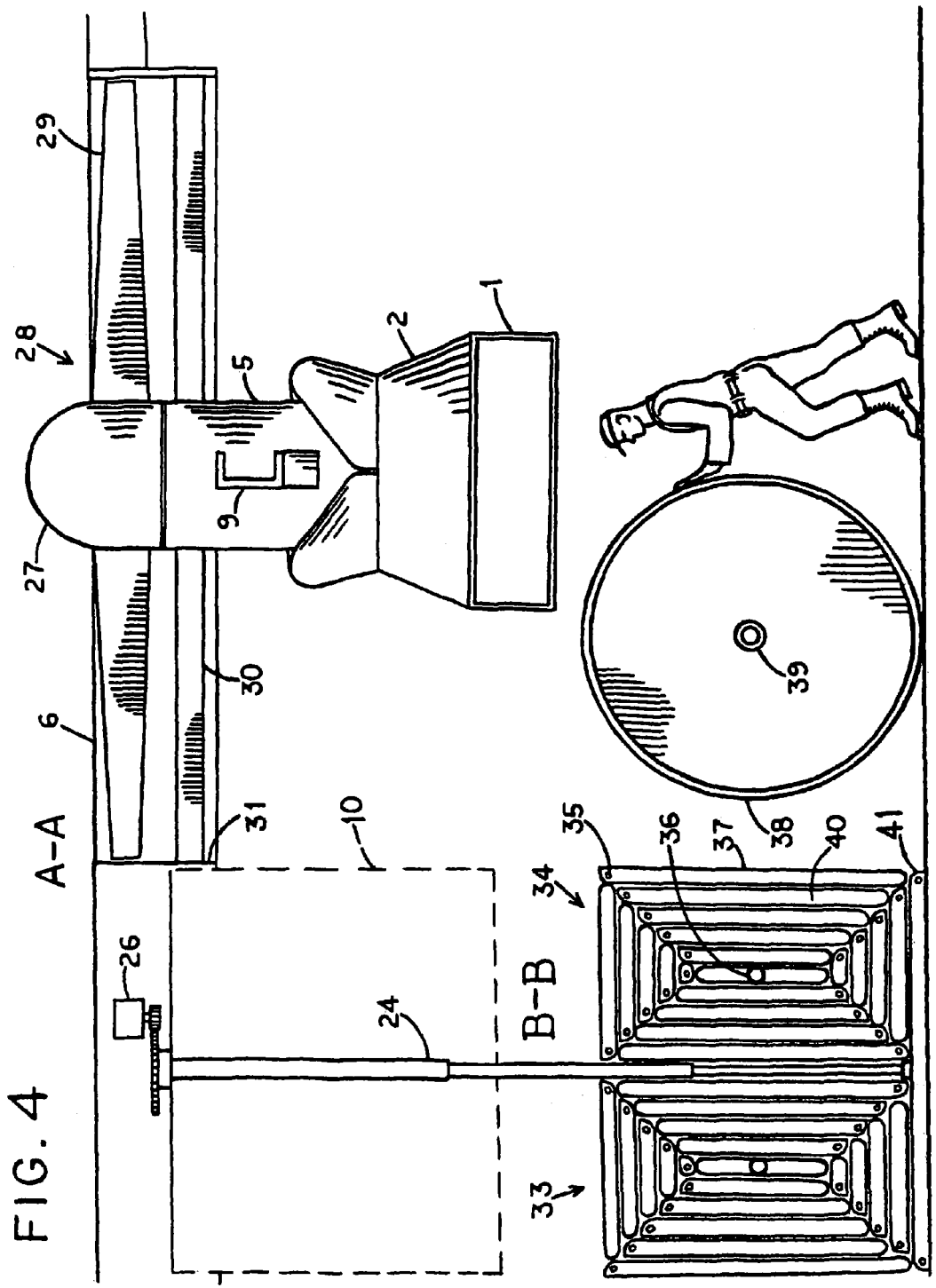
FIG. 4 is a cross section of the cargo and the lift-fan module.

The top half of FIG. 4 is an aligned cross section of FIG. 1. In FIG. 1, cutting plane A-A starts with the top of the fuselage, then jogs to the right in order to miss cargo pack 10 while still capturing the whole lift fan module 28 shown in FIG. 4.

Lift fan 28, now stopped, has a hub 27 which holds rotating blades such as 29, one out of perhaps ten blades, with a diameter of about 16 feet. Power to turn the blades comes from two-stage turbine 2 receiving at the top working gas at a pressure ratio of some 5:1 from combustion chamber 3 of FIGS. 1 and 3. FIG. 3's shaft 25 plus some gearing in housing 5 will transmit the turbine's power upward to FIG. 4's lift fan hub 27. Gear housing 5 is centered in the pylon bore 31 by a ring of stators 30. The lift fan's upward thrust is transmitted to housing 5, then through C-beam 9 to spar 14 of FIG. 3 (Rear spar 83 in FIG. 16 would take the other half of the lift.) Most of these components will be seen in aircraft 77 of FIG. 16. All this apparatus is the same as in my co-pending U.S. application Ser. No. 12/807,311 for a variable-cycle VTOL powerplant.

The Compact State

This is the rolled-up landing pad contained as cargo pack 10 of FIG. 3. The landing pad was rolled up before takeoff into two separate units which are now seen as end elevations 33 and 34 in FIG. 4. These rectangular shapes are the front view of cargo pack 10 of FIG. 3 along cutting plane B-B. One of the three screw jacks 24 from FIG. 3 is also in FIG. 4. Screw jack 24 all along has been threaded into the center of base plate 41, thereby making part of the support structure for items 33 and 34.

The load method is explained. Dividing the landing pad into equal halves 33 and 34 allows centrally-located screw jack 24 and base plate 41 to hold both halves in balance during cruise flight. Three screw jacks like in FIG. 3 could be enough. The advantage of screw jacks 24 in the center of base plate 41 is that they will be out of the way when landing pad halves 33 and 34 are unrolled.

Deploying the Landing Pad

FIG. 4 shows the two "roll-packs" 33 and 34. They are made up of many long slats like 37 which are hinged together at the edges with pins such as 35. The upward height of slat 37 seen is the slat width, not the length. The length of slats 37, 40 and the others is the long dimension of cargo load 10 in FIG. 3, about 36 feet. Slat thickness in FIG. 4 is about 3.75 inches.

In FIG. 4, the hinge at 35 between two slats can be many tongue-and-groove joints with long rod 35 passing through all of them. Tongue 42 and groove 49 which will be seen in FIG. 12 is the type which represents all the joints seen in FIGS. 4-8 and 10-15. The joints in those Figures show the pivot rods such as 35, but not the tongues and grooves, avoiding repetitive detail.

In FIG. 4, unrolling will be left and right to the sides of base plate 41. Only roll-pack 34 will be examined in detail. Axle 36 through the innermost, "central" slat starts the unrolling operation. Central slat 48 is identified in FIG. 5 which is less crowded. (A side view of a bigger axle end 36 will be seen in FIG. 12). In FIG. 4, wheel 38 will be moved up to axle 36 by the soldier, then pushed inward until hub 39 is journaled on the axle end. Wheel 38 is drawn at $$6\frac{1}{2} \text{ feet,}$$

feet, so that hub 39 is the same height above the ground as axle 36. Before unrolling can begin, second wheel 20 from FIG. 3 would slip over a second axle end (seen in FIG. 9) like 36 but at the far end of roll-pack 34.

FIG. 5 shows the beginning of the unrolling. Wheel 38 is drawn mainly in outline. A husky soldier like the one in FIG. 7 can be imagined to have pushed on wheel 38 in FIG. 5, starting it rolling to the right. The second soldier at the far end (seen in FIG. 9) pushes on his wheel at the same rate. In FIG. 5, the unrolling is controlled primarily by the pull on slat 37, not so much by wheel 38 because axle 36 free-wheels in hub 39.

The shape of roll-pack 34 is significant. There are a great many pivot joints at 35, 42 and the rest. There is enough looseness in the joints to let roll-pack 34 "slump" to the rhomboid shape shown. This is actually a good thing for the unrolling. It lets axle 36 stay the same height above the ground as hub 39 is above the ground. Now roll-pack 34 is "slouching" over the end of base plate 41, and axle 36 is at the same height as it was in FIG. 4.

Slumping and slouching can be understood by having another look at FIG. 4. In roll-pack 34, the diagonal distance between axle 36 and the base plate corner at 41 is greater than the height of axle 36 above the ground. If roll-pack 34 started to unroll to the right and stayed rectangular, axle 36 would have to rise a little to pass over corner 41. That's impractical for a roll-pack which can weigh two tons. Better to let it slump a little in FIG. 5.

FIG. 6 shows the unrolling in progress. First slat 37 is approaching the ground. The pull by slat 37 has restored roll-pack 34 to a rectangular shape. That seems to contradict the previous paragraph. But no, it just means that wheel 38 has rolled farther than slat 37 has leaned forward. Wheel 38 and unseen wheel 20 at the far end are both outside turbine protector 1. Of course, roll-pack 34 itself can't be allowed to hit turbine protector 1. Slat 37 is named "first slat 37" because it's at one end of roll-pack 34 and that end is the nearest to base plate 41. Slat 37 is hinged to base plate 41, as suggested by the hinge pin near the leader for numeral 41.

In FIG. 7, slat 37 is on the ground. Roll-pack 34 has slumped again, but this time in the other direction because the length of slat 43 plus the remainder of the forward lean of slat 37 slightly exceeds the distance travelled by wheel 38 since FIG. 6. Again, the main thing is that axle 36 is the same height above the ground.

In FIG. 8, roll-pack 34 has reverted to a rectangle because slat 43 is no longer moving to the right, whereas axle 36 is so moving. Even though the height of roll-pack 34 has increased, having recovered from the slumped condition, there is enough clearance to turbine protector 1.

FIG. 9 gives the wide-angle overview as the top of roll-pack 34 emerges from below turbine protector 1. In the real world, the clearance would be adversely affected by bumpy ground or tufts of grass. If so, the sides of turbine protector 1 can be hinged (not shown.) An upward push on the bottom would make it fold up and out of the way; and kept there by setting a latch.

The rest of the unrolling seems easier. The soldiers might tire, but offsetting that, two-ton roll-pack 34 steadily gets lighter as more of it stays on the ground.

Considering the load in a new way, 4,000 lbs is about the weight of a car. Two husky soldiers should be able to start pushing that.

In FIG. 9, tongue 44 and groove 45 are part of the hinge at the present top edge of roll-pack 34. Items 44 and 45 are possibly a stronger version of the hinges. Axle 36 not only journals hub 39, but should extend all the way through the roll-pack, as shown, providing strength against sagging in the middle by the two-ton load. A brief look at FIG. 12 shows how some bulges in the innermost slats accommodate a much thicker axle 36, for strength. The bulges don't matter because the innermost slats end up at the landing pad's edge.

FIG. 10 shows close to the end of unrolling. By now the left edge of slat 47 is 42 feet from FIG. 9's socket 46 on the centerline of base plate 41. In FIG. 10, the six slats from 47 to 48 add another eleven feet, giving a total of 53 feet out of roll-pack 34 which was in the compact state.

The Compact State II

In FIG. 4, the height of roll-pack 34 plus base plate 41 is about 6 feet 4 inches. Thus, the landing pad stretch to 53 feet is almost 8½ times as much. This is the advantage of the compact state. Its small cross section, as with roll-pack 33, made possible high-speed air transport with minimum drag by airplane 60 of FIG. 1.

FIG. 4 shows the close packing of slats 37, 40 et al. Close packing is achieved by most slats obeying a simple rule. The rule is that the width of a slat is two slat thicknesses more than the width of the next interior slat which is flat against the said slat. As an example, slat 37's width (the vertical dimension which shows in FIG. 4) is two slat thicknesses greater than slat 40's width.

The rule doesn't apply to the central slat, the one which holds axle end 36. It is shorter than the two vertical slats on either side of it. Similarly, the two shortest slats, above and below the central slat, don't obey the rule either: Neither one has a next interior slat flat against it.

FIG. 4 suggests the vertical slat just to the right of the one holding stub shaft 36 could have been designated the "central" slat instead. Then it would hold stub shaft 36. Either slat can be the central slat when there is an even number of vertical slats.

The Deployed State

Figure 16:
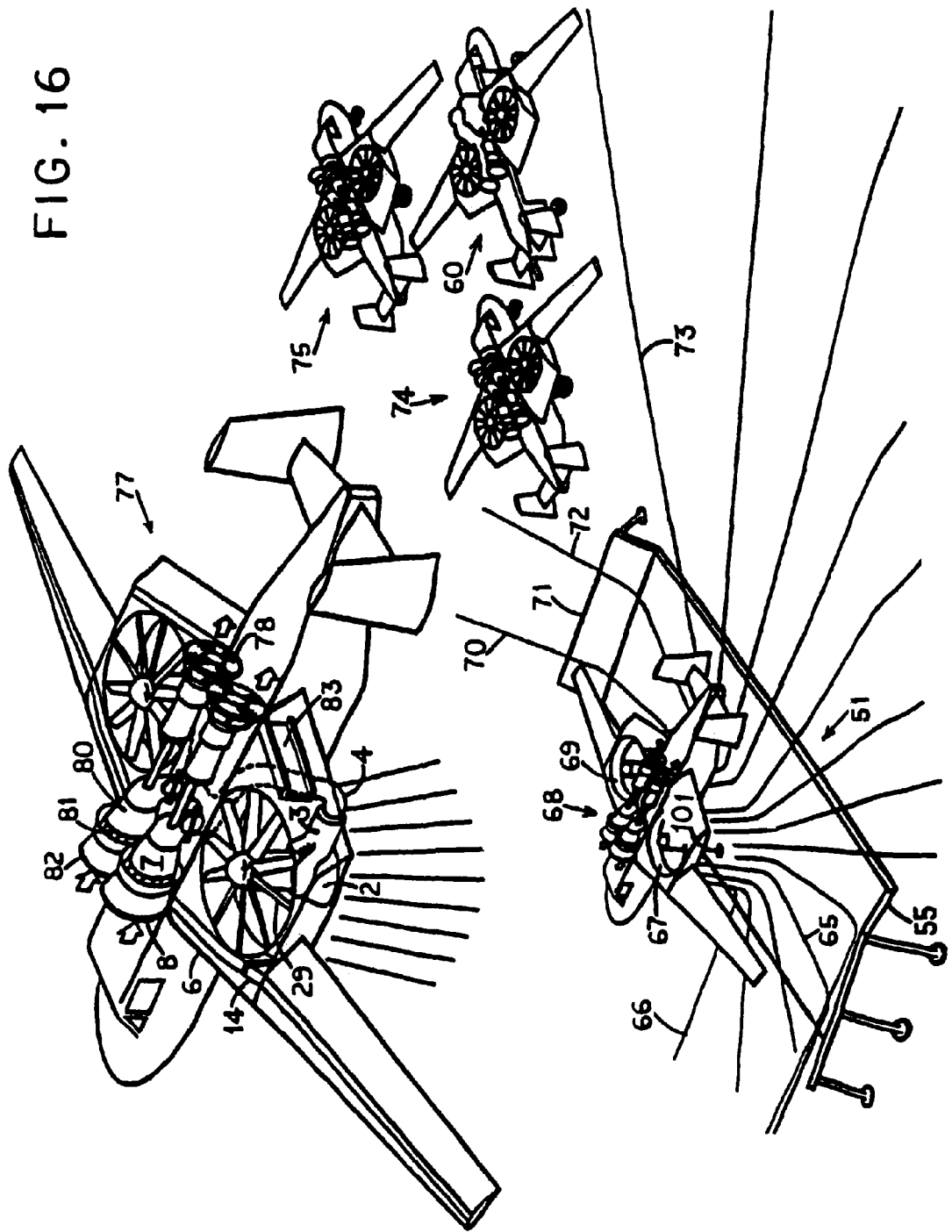
FIG. 16 is an oblique overhead of the landing pad in intended use.

In FIG. 16 landing light 101 is below airplane 68. Light 101 is on the centerline of FIG. 17's base plate 41. In FIG. 16 the flat to the right of light 101 is unrolled and stretched-out former roll-pack 33. The whole landing pad 51 will be 2×53'=106 feet across, enough to accommodate lift-fan airplanes with a wingspan of 70 feet, the same as in FIG. 16. The other dimension of landing pad 51 is the length of cargo pod 10 in FIGS. 1 and 3, or 36 feet. Thus, the flat part of landing pad 51 in FIG. 16 is 106' by 36'. 36 feet is easily more than the wheelbase of the landing gears for troop-carrying airplanes 74, 75 of FIG. 16. There should be more than enough room for a lift-fan airplane to land on, given the positioning aids which will be suggested in connection with FIG. 16.

Deployment Re-Visited

In FIG. 11, the presence of axle end 36 on the ground means that roll-pack is fully deployed. Excepting the positioning of wheel 38 on axle end 36 in FIG. 5, no assembly was needed. That means fast deployment, an advantage in a combat zone.

FIG. 11 also shows the anchoring of the landing pad. One of the husky guys stands in front of landing pad 51. The man holds a compressed-air gun tube 50 which recently shot large nail 52 through the end of landing pad 51 and into the ground. Nail 52 will anchor the end of landing pad 51 against flapping under the windblast. More nails (one shown) may be needed to hold down the landing pad.

The process might be thought to end there. Landing pad length outboard of a lift fan will be $$\frac{1}{2}(106' - 8' - 2 \times 16') = 33 \text{ feet.}$$

Sticks and pebbles under that stretch of landing pad are out of reach of the windblast. But lift-fan air downflow velocity of 224 ft/sec won't be slowed down much after only 33 feet of friction and spreading out. Debris on the ground beyond the 33 feet cam still be picked up and set to flight. Landing pad preparation can't stop yet.

Inclined Wall and Last Steps

After the landing pad comes the inclined wall. This was seen in FIG. 3 as portable wall 17 plus support legs 16. Two husky guys started its deployment by moving it away from cargo load 10.

Going back in time now, wall 17 was stored for air transport as shown in FIG. 12. It was draped over roll-packs 34 and 33 in the most compact way possible: Wall 17 adds very little width to cargo pack 10, and brace legs 16 add very little height to cargo load 10.

FIG. 14 shows the installation of wall 17 as an inclined surface adapted to deflect upward some of the windblast from landing aircraft. Large nail 52 through the pivot tab helps keep wall 17 in place. Ten feet away, blade 53 penetrates the ground to secure bracing leg 16.

In FIG. 15, airplane 60 which brought the landing pad in the compact state is taxiing off deployed landing pad 51. Front fan 8 provides the push. Lift-fan turbine 2 is idle. FIG. 15 is drawn somewhat stylized: Airplane 60 has been moved to its left to fit the Figure; there is more landing pad 51 to the left, off the page. Before airplane 60 could move, motor 26 in FIG. 4 reversed its rotation, freeing screw jack 24's threaded lower end from now immobile base plate 41. Screw jack 24 then retracted all the way up, as seen in FIG. 15. The same for the other two screw jacks.

What airplane 60 would be doing now, in actuality, is that rear landing gear 62 would leave the dirt and climb onto base plate 41. Base plate 41 is best seen in FIG. 9. Then (not shown), rear landing gear 62 will roll the entire length of base plate 41, finally to roll off the base plate and move airplane 60 onto dirt to go park.

Returning to FIG. 15, free-standing number 61 without leader or underline stands for the volume it is in. Void 61 is where cargo pod 10 of FIG. 1 had been. Thus, there is a cavernous void 61 in the fuselage in FIG. 15, with the thin structural spine 15 above the void. This might flex, except for long brace 32 first seen in FIG. 2. A slightly different version is in FIG. 15: More slender, and streamlined. Now separate fuel tank 59 may be needed. Realistic landing pad 51 is bumpy from half-squashed tufts of growth 56.

Outrigger landing gear 63 has turned downward so the aircraft won't tip over when it moves or turns. Retracted position 64 reduced drag during cruise. It's also the position it would have in FIGS. 7-9 when roll-pack 34 moved past turbine protector 1; and in addition, when portable wall 17 was moved in FIG. 3. At those times, the aircraft if standing only on the narrow-track landing gear legs like 11 of FIG. 1 could tip over. To avoid that, in FIGS. 3 and 15, widerstance main landing gear 62 is eight feet across; about the widest it can be and still retract into the fuselage eight feet wide. A similar wide-track could replace the narrow front one 11 in FIG. 1.

In FIG. 15, an improvement to short wing 58 is tip plate 57, a known way to reduce the airflow curling around the wingtip. This boosts the lift from small wing 58 during cruise flight.

The Landing Pad in Operation

In FIG. 16, the military mission is under way. Airplane 60 which brought landing pad 51 taxiied off a while ago and parked. Troop-carrying airplanes 74 and 75 landed afterward and parked too. Their soldier passengers presumably are starting the assembly of personnel. Continuing the massed landing, troop-carrying airplane 68 is landing. Lines such as 66 radiating away from the underside of airplane 68 symbolize the original blast of air at 224 ft/sec which rushed thru the bores 67 and 69 of the lift fans but is now hugging the ground.

We now digress to the landing itself. Landing airplane 68 near the center of landing pad 51 could be tricky because the fuselage blocks the view. This is the location problem. There is also a control problem, because the airplanes as described so far can't fly backward and sideways like the V-22 Osprey.

The location problem is solved by adding a small but strong light 101 and cutting a viewing hole in the cockpit floor of airplane 68, 74, 75 and 77. The pilot would look down through the viewing hole. The hole in the cockpit floor might be a foot square and be near the pilot's feet. A strong glass would cover the hole so as not to step through it. As suggested by FIG. 1, the nose landing gear's wheel well is itself a viewing opening. Beginning the landing approach, the pilot looks down through the hole to spot the light. Throughout descent, the pilot maneuvers the airplane to keep the light in sight below the hole.

The control problem is solved with an APU delivering compressed air to small air ducts (not shown) reaching toward the airplane's extremities. This would be needed anyway, for attitude control during descent. Systems of that type are well-known in the art (for instance, ducts 40a and 40b in FIG. 3 of U.S. Pat. No. 5,275,356), therefore not included here. It would be necessary to make nozzles like 126a and 126b of U.S. Pat. No. 5,275,356 swivel to horizontal, to deliver the push to make aircraft 68 move side-to-side. A similar thing would be done in a fore-and-aft direction. These air ducts should already be there too, for pitch control. We suppose aircraft 74 and 75 thusly landed safely. We now return to the mission.

Airplanes 74 and 75 are now parked out of reach of probable debris trajectory 73. Inclined wall 71 deflected lift fan air blast 70, 72 upward, eliminating the hazard from that direction. Inclined wall 55 is the larger size shown in FIG. 13. It replaces inclined wall 17 of FIGS. 14-15. Thus, in FIG. 16, inclined walls 55 and 71 create "shadow zones" behind them where aircraft and personnel are safe from windblast. Furthermore, flying debris in those directions should be none, because landing pad 51 covers the ground.

In FIG. 16, the next aircraft to land will be troop-carrying lift-fan airplane 77. It is hovering until airplane 68 lands and taxies out to go park. Airplane 77's propulsion and lift system is the same as for the airplane in FIGS. 1-4, so some numbers are re-used. There are two identical gas turbine power plants for the lift fans. Each one is a variable cycle controlled by a flow valve 81, as described in my co-pending U.S. application Ser. No. 12/807,311. Identified for the first time in the present document is boost compressor 80 powered by low-pressure turbine 78. Boost compressor 80 takes front fan 82 output and raises its pressure ratio to 5:1 for the lift-fan engine's thermodynamic cycle. Also seen are parts which were previously mentioned: Compressed air duct 4 which brings boost compressor 7's output to combustion chamber 3; and spar 14 which takes half of the upward push from lift-fan blading 29, transmitted by C-beam 9 in FIGS. 1 and 4. Second spar 83 in FIG. 16 takes the other half of the lift.

Lift-Fan Airplanes Examined

Lift-fan aircraft aren't well-known to the public. A 100-passenger airliner with lift fans was proposed in Aviation Week and Space Technology, Jul. 29, 1991, page 57. It is also seen as "Prior Art", FIG. 15 of U.S. Pat. No. 6,892,980. But that was a design study only. There are no lift-fan aircraft in service today. To be useful, our invention should present a new and usable result. To be usable, lift-fan airplanes have to fly again and be practical. It seems appropriate to inquire if that can happen.

The US Army's XV-5A was an airplane with wing-mounted lift fans (FIG. 3, Paper 730360, Society of Automotive Engineers ("SAE"), also in bound SAE Transactions, 82:1229 (1973); Call Number TL1.S6.) Another lift-fan aircraft was the X-22A from 1967 ("The X-Planes X-1 to X-31", Jay Miller, Copyright 1988, Aerofax, Inc., Arlington, Tex.) The lift fans were in pods. Since then there have been few successful examples. The reason is not hard to find: Inefficiency.

The lift force from a rotor varies as the air's downward momentum, "mv", but the rotor work is the kinetic energy of the air, $$``\tfrac{1}{2}mv^2".$$

The second expression increases much faster than the first. That's why large, slow-turning rotors are preferred in helicopters and the V-22 Osprey. They move a large amount of air, "m", rather slowly, "v". Lift fans tend to do the opposite, because the rotors are so much smaller. A lesser amount of air has to flow through the small rotors much faster, to create the same lift. Then the kinetic energy loss grows large.

Lift-fan airplanes will always need a lot of power to achieve vertical flight. The X-22A carried two men but had four engines. A lot of power meant a lot of weight. But steady advances in gas turbine technology, especially turbine blade cooling, have changed the picture. Nowadays, powerful gas turbine engines are relatively light. The T-406 which powers the V-22 Osprey develops 6,150 HP at a weight of 971 lbs (JANE's All the World's Aircraft, 1994-5, page 738.) That's twenty times the power of a cast-iron V-8 car engine at only twice the weight. Lift-fan airplanes might get another chance.

The following is a fairly brief comparison of vertical lift methods and their performance, plus the weight penalties expected. The start is FIG. 20 of SAE Paper 700286, also in bound SAE Transactions 79:951 (1970). FIG. 20 graphs the downwash air velocity, in ft/sec, for helicopter (80), tilt-wing (160), and wing-mounted lift fans (about 450). The tilt-wing mounts propellers, which are a little larger than usual propellers. We verify where on the graph the V-22 Osprey would end up. Its 38-foot rotors are much closer to, say, the $$53\tfrac{1}{2}-\text{foot rotor}$$

of the UH-60A Blackhawk helicopter than to any propeller. We would expect that the Osprey's downwash air velocity be much closer to that of a helicopter than to a tilt-wing's. Indeed, that is the case. Earlier, we calculated it as 94 ft/sec. From above, that is much closer to helicopter's 80 than to tilt-wing's 160.

Similar reasoning is encouraging to our lift-fan estimate. FIG. 20's lift fan, being wing-mounted, is quite a bit smaller than our 16-foot lift fans 27-29 contained in large pylon 6. Then our earlier calculation of 224 ft/sec is about half of FIG. 20's 450 ft/sec therefore believable too.

224/94=2.38 times Osprey's downwash air velocity. Since lift=momentum change=mv, our mass flow for equal lift must be 1/2.38=0.42. As stated earlier, rotor work varies as the kinetic energy of the air, or $$\frac{1}{2}mv^2.$$

Then our lift-fan engine power, compared to Osprey's, must be $(0.42)(2.38)^2=2.38$ times as much.

Using a driveshaft crossing over to a disabled engine, the twin-engine Osprey can fly on one engine of 6,150 HP. Therefore, our lift-fan engine power must be $(2.38)(6,150)=14,630$ HP. In our airplane 77 of FIG. 16, all the visible engine components, plus the hidden lift-fan turbine on the other side, together must produce 14,630 horsepower.

If other things are equal, our total VTOL powerplant will weigh 2.38 times as much as one Osprey T-406 engine of 971 lbs, or 2,322 lbs. It's a weight penalty of 1,351 lbs. Offsetting that is Osprey rotors weight of 4,654 lbs (JANE's All the World's Aircraft, 1998-9, page 557.) If rotor weight varies as swept area, or diameter squared, our rotors like 29 would weigh $(16'/38')^2(4,654)=825$ lbs. Then two of our pylons 6 must weigh no more than 4,654-825-1351 lbs=2478 lbs to erase the weight penalty—A distinct possibility. This concludes the technical analysis of lift-fan airplanes.

The question then is why our lift-fan airplane design is progress. The answer is in three parts:

1) Airplane 77 of FIG. 16 should be fairly low-cost. It's just an airplane with lift fans and a compressed air attitude control system added. With turbine 2 directly below housing 5 and lift fan 29, the gearing would be simple planetary reduction gears. Lift-fan rotor 29 can be fixed-pitch, therefore pressed to near shape in a single operation on a spoked blank of aluminum, a large economy. Even main flow valve 81 is already known: FIGS. 5 and 6 of U.S. Pat. No. 3,280,560. 2) The lift-fan rotors 29 etc are enclosed by pylons such as 6. There are no free-standing large rotors to strike something during massed operations. 3) Fast cruise. Airplane 77 with front fans 8 and 82 should cruise like a conventional airplane, perhaps at 400 knots. Long-range operations may, be possible.

This concludes the lift-fan airplane general inquiry.

Mission Wrap-Up

FIG. 16's aircraft 60, 68, 74, 75 and 77 would leave parking one at a time, taxi to the landing pad, take off from landing pad 51 to reduce flying debris, and return to base.

Although not shown in FIG. 16, turbine protectors 1 as in FIGS. 1 to 4 would have been fitted to aircraft 68, 74, 75 and 77 too. They weren't drawn in because the overhead view obscures them. The need for turbine protectors seems incontrovertible: Large rotor blades 29 could withstand small-arms fire when landing, but the much smaller turbine blades in lift-fan turbine 2 would not.

The Bigger Inclined Wall

FIG. 13 shows an enlarged version 55 of portable wall 17 from FIG. 12. This is to provide a taller deflector of the landing airplane's windblast. Inclined wall 55 when installed has a slant height of 10.7 feet, compared to inclined wall 17's seven feet in FIG. 15. New brace legs 16 in FIG. 13 are extensible from sleeves 54.

Landing Pad Necessity?

Re FIG. 16, the thought occurs to keep only the two slant walls 55 and 71. The windblasts 65 and 72 would still get deflected upward, creating the "shadow zones" of safety. In other words, omit landing pad 51. But airplane 68 if landing on ground, as did airplane 60 of FIG. 1, would place pebbles and small sticks back in the air blast.

One solution is to firmly attach some stout venetian blinds (not shown) to the face of slant wall 71, to trap the sticks and pebbles. They would then roll harmlessly back to the ground at the base of wall 71. There are two possibilities. The first is that the venetian blinds will also trap too much of the windblast and blow away from air pressure. Unless attaching it to the ground is turned into a construction project, something risky in a combat situation.

The second possibility is to drill many small holes in wall 71 to relieve the air pressure. Then wall 71 would stay in place. So, why keep landing pad 51?

Uneven Ground

The answer is that pad 51 is needed because the ground isn't flat. The only solid flat places found in Nature are dry lake beds. Airplane 68 if landing on ordinary ground could get a wheel stuck in an animal's den or just having to climb out of some hollow in the soil. U.S. Pat. No. 2,405,556 for an "aircraft landing net" shows an irregular ground surface. Probably such bumpy dirt will often be encountered. A lift fan airplane like 68 landing with a wheel in a hollow, or just soft dirt, might not be able to taxi out. That would block the landing place (the space between inclined walls 55 and 71.) Aircraft still aloft would need to land widely separated to avoid flying debris.

In U.S. Pat. No. 5,429,324, FIG. 3A presents data relevant to the separation which might be needed. Measured air speeds downstream of the turbofan engines of a 777 airliner are given at takeoff. 150 feet behind the tail of the 777, the airspeed at the ground is 150 MPH. That's a good place to start measuring because our lift-fan air downflow velocity of 224 ft/sec corresponds to 153 MPH. From their graph, air speed on the ground is still 100 MPH at 415 feet from the 777's tail. 100 MPH=146 ft/sec. That's a lot higher than helicopter downwash of 80 ft/sec and Osprey's 94 ft/sec. If somehow still acceptable, then all the lift-fan airplanes which landed after the one that got stuck would have to be 415-150=265 feet from each other. That would be an awkward way to start a coordinated military operation.

A Landing Pad

FIG. 17 shows aircraft 68 formerly from FIG. 16 but having landed and now taxiing off slats 93 and 105. Airplane 68 gets a running start before wheels 95 and 100 of the main landing gear hit the uneven ground. Then momentum can keep the airplane moving through pothole 102 and comparable bumps. The pilot would keep the throttle well open until reaching parking spot like 60, 74 and 75 in FIG. 16.

The running start is a significant advantage and very likely the deciding factor in executing a massed landing smoothly. The space between inclined walls 55 and 71 of FIG. 16 then should never be blocked by a stuck aircraft. Of course, the landing pad itself cannot be creating a problem. Aircraft 68 with a gross weight of 47,500 lbs would put some 20,000 lbs on each main wheel 95 or 100. Slat bending 107 can't be allowed to get too deep.

Slat Construction

FIG. 18 shows several slats out of the many which made up roll-pack 34. Slat thickness is 3.75 inches. In slat 85, ribs 86 are pierced by stringers 87, with the empty spaces filled with lightweight material 88 like polyurethane foam.

Rib 86 is drawn about an inch thick, so stringer 87 is two inches thick. Stringer 87 can be tubing, possibly resembling PVC pipe suited for mass production. The material for both 86 and 87 could be ABS plastic (Acrylonitrile-Butadiene-Styrene.) From the Materials Handbook, "At stresses above their tensile strength, ABS plastics usually yield plastically instead of rupturing . . ." That is all right here if the slat is lightly loaded. This will be shown later.

FIG. 19, however, shows wheel 95 of the main landing gear resting on the framework of a plastic slat. Lath 94 is an attempt to keep soft filler material like 88 of FIG. 18 in place. Wheel 95 happens to be above some natural hollow in the ground, so rib 96 and stringer 97 deflect as a result of the aircraft's weight. More realistically, ribs 96 and stringers 97 will further crush or fold flat, so the strength problem is not solved.

In FIG. 18, slat 93 is built differently from slat 85. Slat 93 is made stronger to cope with the weight on wheel 95 of FIG. 19. In FIG. 18, the changes include different ribs 91 and may include solid rods 92 instead of tubing. Most importantly, a strong steel sheet 90 provides the smooth surface. Bottom sheet 89 is just a cover and can be thin ABS plastic. Rib 91 is stamped steel, welded to top sheet 90 and glued to bottom sheet 89.

Steel sheet 90 will add a lot of weight. Its use will be limited' to where wheels such as 95 touch down. These areas can be fairly precisely identified, helped by the bright-light landing aid 101 previously described for FIG. 16.

FIG. 17 shows the diverse landing pad with the two types of slats. A pair of strong but heavy slats 93 and 105 take the load from main wheels 95 and 100; slats 84, 85 and 106 are neither strong nor heavy. They are made of plastic. Steel sheet 90 topping slat 93 may be ⅛ inch thick—Thin enough to flex, strong enough not to tear. Weight calculations will follow later.

The much lighter slats 84 and 85 would be little more than connective tissue between metal slat 93 and the inclined wall at the end of the pad. In other words, landing pad 51 in FIG. 15 is this "connective tissue." Plastic slats should seldom bear anything heavier than a person: In FIG. 15, outrigger wheel 63's load, if any. With this heterogeneous slat inventory, the landing pad will get heavier, but not much heavier.

FIG. 17 shows airplane 68 a short time after landing. Just before that, bright-light 101 would have guided lift-fan airplane 68 to a vertical landing in which nose wheel 103 is aligned with landing light 101. Main landing gear wheels 95 and 100 will have touched down on the two strong slats 93 and 105, as shown. These slats are each six feet wide. A vertical autopilot may be needed to hit those relatively narrow targets consistently. Failing that, then neighboring slats 85 and 106 may have to be the strong variety too. That adds undesirable weight.

A weight calculation follows for slat 93's top surface 90 made of ⅛-th inch steel. Two thirds-length sheet 90 of 24 feet, instead of the pad's width of 36 feet, would be plenty long enough for main wheel 95 of FIG. 17 to hit. Adding slat 105 of FIG. 17 doubles the amount of steel. Total steel surface area is $(2)(6')(24')=288$ sq ft. $⅛''=1/96'$. Steel volume is $288/96=3$ cubic feet. Steel weighs 490 lbs per cubic foot. Steel sheet weight is $3 \times 490 = 1470$ lbs. Looking at FIG. 18, steel ribs 91 add about half of the surface area of sheet 90. Total steel weight is $$1\frac{1}{2} \times 1470 = 2205 \text{ lbs.}$$

It is about half of the earlier estimate of two tons for roll-pack 34.

If that was two long tons, or 4480 lbs, that would leave about 2200 lbs for all the plastic slats. In FIG. 4, the plastic slats in roll-pack 34 will be all the slats except slat 37. Slat 37 is the same as steel-top slat 93 of FIG. 17. Thus, there is 9 times as much plastic as steel in FIG. 4's roll-pack 34. Now switching from ABS to the densest rigid polyurethane foam at 50 lbs/cubic foot. The density ratio, steel-to-polyurethane, is 490:50, or over 9:1. Then the weight of all the plastic slats is about the same as the weight of the steel slat. The earlier weight estimate of two (long) tons is enough to cover all the slat material in FIG. 4's roll-pack 34.

In FIG. 17, middle slat 41 is base plate 41 for roll-packs 33 and 34 in FIG. 4. The base plate has to be strong too, but for a different reason. During flight, it had to carry the weight of roll-packs 33 and 34. Counting the base plate too, total cargo load 10 weight may add up to 10,000 lbs. In FIG. 17, base plate 41 is constructed of many aluminum I-beams 104 each 36 feet long. They would be supported at three axial stations by, for one, T-beam 108 welded to screw jack socket 46. I-beams 104 should be enough to support nose gear wheel 103, which by the earlier arithmetic would bear some 7,500 lbs load, not 20,000 lbs each as do main gear wheels 95 and 100.

Drag and Fill

FIG. 17's T-beam 108 will be transverse to the direction of flight and will increase drag. Inflatable wedge-shaped balloons 98 of FIG. 1 in front and behind will give streamlining. Quick-detach fasteners (not shown) would allow balloon removal by personnel right after the landing of airplane 60 in FIG. 2. Balloon 98 removal will expose the thin lower edge of T-beam 108. This is for ground penetration.

In FIG. 3, with a total cargo load 10 weight of 10,000 lbs, there would be a weight of 3,333 lbs on T-beam 108 of FIG. 17, and 3,333 lbs on each of the other two T-beams not shown. There should be little problem in driving the web of T-beam 108 into the ground, to achieve a reasonably flat base plate 41 when down, as in FIG. 17.

In view of the heavy load imposed by main wheels 95 and 100, there could be a problem if slat 105 happened to lie above a hollow like 102. Then slat downward deflection 107 might be excessive. In FIG. 19, a solution is to fill hollow 99 with balloon 98 after it is detached from airplane 60 in FIG. 2. Such balloons would need a strong skin, but air pressure distributes the load to an extent. Thus, a small amount of site inspection and preparation would be needed.

The need for a strong skin on balloon 98 is emphasized by comparing FIGS. 18 and 19. In FIG. 18, the narrow bottoms of ribs 91 are about the same width and spacing as ribs 96 of FIG. 19. If the framework in FIG. 19 is imagined to be extended over balloon 98, and wheel 95 is moved there too, the concentrated line loading by ribs 96 would be the same if it was ribs 91 instead.

Last Details

Our FIG. 20 shows an improved version 112 of large nail 52 from FIGS. 11, 14 and 15. In FIG. 20, the nail is in two parts 111 and 114. They were together and looked like nail 52 when nail 112 was shot into place (not shown.) "Pull-head" nail 112 lets the landing pad shorten when part of the pad is deflected downward by a hollow in the ground, as in FIG. 19. Nail top half 111 comes off bottom half 114 and lets slat 110 retract a little. Strong elastic 113 bonded at both ends to the nail halves keeps the tension on the landing pad. Simplicity is nail 112's advantage. It, plus many others could replace the spring-loaded landing pad tensioners seen in U.S. Pat. Nos. 1,363,539; 2,358,426; 2,360,674; 2,405,556; 2,814,453; and 2,851,232.

FIG. 3 shows a heat-insulating cover 23 downstream of turbines such as 78. The hot exhaust from the turbines can't be allowed to heat and weaken the structure of shallow spine 15. Cover 23 is raised several inches above spine 15. The air space between them is continually swept by air entering at the front and exhausted at the rear by motor-driven fan 22.

In FIGS. 2 and 3, screw jacks 24 could be replaced by other lifting devices: Winches and cable or rope, for instance. In short, hoists of some type.

Definitions follow. "Vertical" flight does not exclude deviations from straight up and down. "Hinge" can mean some flexible joint not necessarily including a pivot. An example is item 16, FIG. 6 of U.S. Pat. No. 2,978,020. "Half of a hinge" would mean the half nearest a slat. "Ground" is not just soil but includes grass or small tufts of growth that people can just walk on. Small bushes isolated on an otherwise suitable site would presumably be lopped off at the base and tossed aside.

The Wrap-Up

The V-22 Osprey, with a calculated air downflow velocity of 94 ft/sec, hasn't generated concern about flying debris damage. However, there has been a report of someone knocked off his feet.

In another caveat, a Eurocopter spokesman said, "tiltrotor . . . downwash speed as remaining a challenging area." (Aviation Week & Space Technology, Nov. 12, 2007, page 68.) It takes little imagination to foresee that our downwash speed of 224 ft/sec, compared to a helicopter's 80 and Osprey's 94 ft/sec, as a large potential problem. That is the justification for our landing pad.

Lift-fan airplanes are deemed a good thing herein even though they need so much more power to achieve vertical flight than do helicopters and tilt-rotors. Lift fans may be a viable concept only because of the great advances in turbine inlet temperature by metallurgists and blade air cooling engineers. Our input to lift-fan technology in U.S. application Ser. No. 12/807,311 is to make the cruise engine part of the lift-fan engine, to save weight. It is electronically published as US-2012-0056034-A1 on the PAIR system.

FIGS. 3 and 16, long duct 4 carrying compressed air to the lift-fan turbine has an analog. FIG. 15 "PRIOR ART" of U.S. Pat. No. 6,892,980 shows compressed-air lines going from core engines 160 to lift fans 162. One difference is their lines carry bleed flow; our line does not.

Astronautics and Aerospace Engineering, June 1963, page 68 compares VTOL lift methods and is a check on FIG. 20 of SAE Paper 700286.

The scope of the invention is found in the appended Claims.

APPENDIX A: Air Downflow for Vertical Lift (A) The Lift Equation: $L=(\rho Av)v$, Equation 12; SAE Paper 660576. L=lift, $\rho$=air density, A=rotor swept area, v=air velocity. Sea Level air at Standard Temperature and Pressure takes about 13.24 cubic feet to weigh 1 lb. Thus, one cubic foot weighs 1/13.24=0.0755 lb/cu. ft. Density is weight divided by g=the acceleration due to gravity. So, for air at Sea level, $\rho=0.0755/32.16$ ft/sec$^2$=0.00235 slug/cubic foot.

(B) Osprey takeoff. V-22 Osprey. Rotor diameter is 38 ft 1 inch (JANE's All the World's Aircraft, 1998-9, page 558.) Rotor area (two rotors) $A=2\pi R^2=2\pi(1/2\times38.0833')^2=2278.18$ sq. ft. osprey takeoff gross weight is 47,500 lbs (JANE's, 19.98-9, p. 559). Then, using Equation 12, $47,500=(0.00235)(2278.18)(v^2)=5.3537\ v^2$. Dividing out, $v=(47,500/5.3537)^{1/2}$=the square root of 8,872=94.19 ft/sec. This is the air downflow velocity from Osprey rotors during takeoff at full gross weight.

(C) Our lift-fan airplane. Rotor diameter is 16 feet (Drawing, FIG. 4.) Two-rotors swept area $A=2\pi R^2=2\pi(1/2\times16')^2=402.12$ sq. ft. Say on takeoff the gross weight is the same as for the Osprey. Then $47,500\ lbs=(0.00235)(402.12)(v^2)=0.9449\ v^2$. Dividing out, $v=(47,500/0.9449)^{1/2}$=the square root of 50,266=224.21 ft/sec. This is the air downflow velocity from our rotors during takeoff at full gross weight. It is 2.38 times as fast as Osprey's 94.19 ft/sec.

The invention claimed is:

1. A flying-in landing pad for a lift-fan aircraft system comprising a lift-fan airplane and cargo,
   said lift-fan airplane comprising:
      a fuselage, two pylons, two lift-fans, two wings and a main landing gear;
      wherein said pylons are attached to said fuselage, said wings are attached to said pylons and each of said pylons encircles one of said lift-fans;
      wherein said fuselage comprises two sections and a spine:
         said two sections being a cockpit section and a tail section, and
         said spine located longitudinally along the top of said fuselage and connecting the said two sections;
      wherein said main landing gear comprises a front half and a rear half:
         the front half disposed at the cockpit section, and
         the rear half disposed at the tail section;
      the lift-fan airplane further comprising a lengthwise cavity extending along a longitudinal axis of the lift-fan airplane and formed between the cockpit section and the tail section such that the lengthwise cavity is located below the spine, the lengthwise cavity opens vertically downward, and the lengthwise cavity has a length substantially equal to a distance between the cockpit section and the tail section;
   said cargo comprising a base plate and a rolled-up landing pad, and said base plate and said rolled-up landing pad configured to be contained in the lengthwise cavity:
      said base plate disposed substantially within the lengthwise cavity of the lift-fan airplane and having a plurality of vertical hoists:
         the vertical hoists having one end connected to the base plate along a center longitudinal axis of the base plate and another end connected to the spine; and
         the vertical hoists configured to lower the base plate from substantially within the lengthwise cavity to the ground and further configured to be disconnected from the base plate;
      said rolled-up landing pad comprising a first roll-pack and a second roll-pack, each roll-pack having a rolled-up configuration and a laid-out configuration and further having a length greater than a width, each roll-pack comprised of a plurality of slats:

each of the plurality of slats of each roll-pack being substantially rectangular and each of the plurality of slats of each roll-pack having two short edges and two long edges;

the plurality of slats of each roll-pack arranged side-by-side along the long edges and connected by hinges along the long edges;

the plurality of slats of each roll-pack each having varying widths of the two short edges such that when arranged side-by-side, each of the slats of narrower width is disposed between two slats of wider width, and when each roll-pack is in the rolled-up configuration the plurality of slats of each roll-pack each form a rolled-up structure in which said wider slats are substantially vertical;

one slat of the plurality of slats of each roll-pack located closest to the longitudinal axis of the base plate when in the laid-out configuration is designated as a first slat, and one slat of the plurality of slats of each roll-pack located farthest from the longitudinal axis of the base plate when in the laid-out configuration is designated as a central slat;

the first slat of the plurality of slats of each roll-pack connected to said base plate by at least one hinge;

the central slat of the plurality of slats of each roll-pack having two stub shafts disposed at opposite ends of the central slat to form a substantially coaxial arrangement;

the first roll-pack and the second roll-pack disposed laterally side-by-side on the base plate when in the rolled-up configuration and separated by a gap such that the plurality of vertical hoists are disposed within the gap;

said cargo further comprising two wheels, each wheel having a diameter greater than the vertical height of the rolled-up structure; and each stub shaft of the central slat of each roll-pack configured to have one of the two wheels rotatably mounted on said stub shaft so motion may be imparted to unroll and transition each roll-pack from the rolled-up configuration to the laid-out configuration.

2. The flying-in landing pad for lift-fan aircraft system of claim 1, the cargo further comprising:

a portable wall having a length substantially the same as the length of the plurality of slats, and comprising a face and a plurality of support legs:

the face having two long face edges, the plurality of support legs attached along one long face edge and substantially perpendicular to said face;

the portable wall disposed alongside one of the first roll-pack or second roll-pack when said roll-pack is in the rolled-up configuration such that the face of the portable wall is adjacent to a vertical side of said roll-pack and the plurality of support legs extend horizontally above at least one roll-pack; and the portable wall disposed on the ground and alongside the central slat of one of the first roll-pack or second roll-pack when said roll-pack is in the laid-out configuration such that the long face edge not having support legs is attached adjacent to said central slat and at a slant to said central slat.

\* \* \* \* \*